US011921930B1

(12) United States Patent
Chou et al.

(10) Patent No.: US 11,921,930 B1
(45) Date of Patent: Mar. 5, 2024

(54) SYSTEMS AND METHODS FOR ADJUSTABLE HAPTIC DAMPING POSITIONING

(71) Applicant: Dell Products L.P., Round Rock, TX (US)

(72) Inventors: Yi-Ming Chou, Taipei (TW); Chiu-Jung Tsen, Zhubei (TW); Hsu-Feng Lee, Taipei (TW); Gerald Rene Pelissier, Mendham, NJ (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/150,120

(22) Filed: Jan. 4, 2023

(51) Int. Cl.
*G06F 3/16* (2006.01)
*A63F 13/285* (2014.01)
*G06F 3/01* (2006.01)

(52) U.S. Cl.
CPC ............ *G06F 3/016* (2013.01); *A63F 13/285* (2014.09)

(58) Field of Classification Search
CPC ................................ G06F 3/016; A63F 13/285
See application file for complete search history.

(56) References Cited

U.S. PATENT DOCUMENTS

| | | | | |
|---|---|---|---|---|
| 9,716,423 | B1* | 7/2017 | Szeto | H02K 33/16 |
| 10,782,784 | B2* | 9/2020 | Szeto | H01H 3/503 |
| 2010/0173686 | A1* | 7/2010 | Grant | F41A 33/06 |
| | | | | 463/2 |
| 2011/0224523 | A1* | 9/2011 | Budiman | A61B 5/14532 |
| | | | | 345/184 |
| 2012/0232780 | A1* | 9/2012 | Delson | A63F 13/285 |
| | | | | 340/407.1 |
| 2014/0098038 | A1* | 4/2014 | Paek | G06F 3/04886 |
| | | | | 345/173 |
| 2016/0175711 | A1* | 6/2016 | Billington | G08B 6/00 |
| | | | | 340/407.2 |
| 2017/0032631 | A1* | 2/2017 | Sreetharan | B06B 1/045 |
| 2018/0136738 | A1* | 5/2018 | Argiro | G06F 3/0227 |
| 2019/0050056 | A1* | 2/2019 | Szeto | H01F 7/1615 |
| 2019/0094965 | A1* | 3/2019 | Buchanan | G06F 3/016 |
| 2019/0094976 | A1* | 3/2019 | Szeto | G06F 3/016 |
| 2019/0147712 | A1* | 5/2019 | Szeto | G08B 6/00 |
| | | | | 340/407.1 |
| 2019/0184428 | A1* | 6/2019 | Sreetharan | B06B 1/12 |

\* cited by examiner

*Primary Examiner* — Ibrahim A Khan
(74) *Attorney, Agent, or Firm* — Norton Rose Fulbright US LLP

(57) ABSTRACT

An input device for an information handling system ay detect an adjustment to a position of a damping medium of a linear magnetic ram of the input device. The input device may generate haptic feedback based on the detected adjustment to the position of the damping medium of the linear magnetic ram of the input device.

17 Claims, 10 Drawing Sheets

SYSTEMS AND METHODS FOR ADJUSTABLE HAPTIC DAMPING POSITIONING

FIELD OF THE DISCLOSURE

The instant disclosure relates to information handling systems. More specifically, portions of this disclosure relate to adaptive damping for a linear magnetic ram in an input device connected to an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A variety of input devices are available for use in providing user input to information handling systems. For example, popular input devices include keyboards, computer mice, handheld controllers, such as gamepads, and other input devices. To enhance immersion, particularly when executing gaming applications, input devices may include rumble modules, such as rumble modules including eccentric rotating mass (ERM) motors, to provide haptic feedback. The ability to provide haptic feedback using rumble modules including ERM motors may, however, be limited, as ERMs of the rumble modules may be fixed in frequency and may only be adjustable with respect to intensity.

Shortcomings mentioned here are only representative and are included simply to highlight that a need exists for improved information handling systems. Embodiments described herein address certain shortcomings but not necessarily each and every one described here or known in the art. Furthermore, embodiments described herein may present other benefits than, and be used in other applications than, those of the shortcomings described above.

SUMMARY

An input device, such as a handheld controller, for an information handling system may include a linear magnetic ram for generating a wide range of haptic feedback effects and patterns. A linear magnetic ram haptic feedback module may, for example, operate at a wide range of frequencies and intensities. A position of a damping medium that a hammer of a linear magnetic ram is configured to impact to provide haptic feedback may be adjustable to provide an even more versatile range of haptic feedback effects. Adjusting a position of a damping medium may also be referred to as adjusting a preload of a haptic damping medium. For example, such a damping medium may be manually adjustable by a user, and an input device may generate haptic feedback based on such adjustments to allow a user to feel the difference in haptic feedback as a position of the damping medium is adjusted. An input device may further transmit information regarding the positioning of the damping medium to an information handling system to allow the user to view information regarding the positioning of the damping medium. Such features may enhance a user experience, allowing a user to customize haptic feedback according to the users preferences and allowing the user to view data regarding the customized haptic feedback.

A method for adjusting a position of a damping medium of a linear magnetic ram of an input device may begin with detecting, by an input device for an information handling system, an adjustment to a position of a damping medium of a linear magnetic ram of the input device. The input device may be a handheld controller and may, for example, include one or more linear magnetic rams for providing haptic feedback to user, such as haptic feedback for a gaming application executed by an information handling system to which the input device is connected. In some embodiments, the input device may include two, or more, linear magnetic rams for providing haptic feedback. The input device may generate haptic feedback based on the detected adjustment. For example, the input device may cause a hammer of the linear magnetic ram to impact the damping medium based on the detected adjustment. Such haptic feedback may allow a user to feel the difference in haptic feedback provided by different positions of the damping medium as the position of the damping medium is adjusted. The adjustment to the position of the damping medium may include a change in a distance between the damping medium and a magnet of the linear magnetic ram. For example, a magnet of the linear magnetic ram may be stationary relative to other components of the linear magnetic ram, such as a housing of the linear magnetic ram, while the damping medium may be movable either closer to or further from the stationary reference point of the magnet. Movement of the damping medium either closer to or further from a resting position of a hammer of the linear magnetic ram may change the haptic feedback generated when the hammer is caused to impact the damping medium.

In some embodiments, detecting the adjustment to the position of the damping medium may include detecting a manual adjustment to the position of the damping medium by a wheel roller of the input device. For example, a user of the input device may roll a wheel roller that extends beyond a surface of the input device to manually adjust a position of the damping medium.

In some embodiments, a magnetic sensor may be coupled to the damping medium and may measure a distance between the magnetic sensor and a magnet of the linear magnetic ram. For example, a magnetic sensor may be coupled to a thread roller coupled to the damping medium and a position of the magnetic sensor may be adjusted when the position of the thread roller and damping medium are adjusted. In some embodiments, the input device may calculate a haptic force of the linear magnetic ram based on the measured distance between the magnetic sensor and the magnet of the linear magnetic ram. For example, a controller of the input device may calculate the haptic force of the linear magnetic ram.

The input device may transmit an indication of the adjustment to the position of the damping medium to the information handling system. The indication may, for example, be an indication that the damping medium has been moved closer to or further from a stationary magnet of the input device. The information handling system may then display an indication of the adjustment to the damping medium to a user. In some embodiments, the input device may transmit a calculated haptic force to the information handling system. The information handling system may display an indication of the calculated haptic force to a user.

A hand-held input device, such as a hand-held controller, for an information handling system, may include a linear magnetic ram. In some embodiments, the hand-held input device may include multiple linear magnetic rams. The linear magnetic ram may include a housing for housing one or more components of the linear magnetic ram, a damping medium, a hammer for impacting the damping medium, a magnet, and a motor for causing the magnet to drive the hammer to impact the damping medium. A position of the damping medium may be adjustable. For example, a distance between the damping medium and the magnet may be adjustable. The damping medium may be coupled to a thread roller for adjusting a distance between the damping medium and the magnet. For example, when the thread roller is rolled, the thread roller and damping medium may be moved closer to or further from the magnet. The thread roller may be positioned within a wheel roller of the input device, and the wheel roller may be configured to adjust a position of the thread roller, such as to roll the thread roller, when the wheel roller is rolled. The wheel roller may extend above a surface of the input device to allow a user to adjust the distance between the damping medium and the magnet by adjusting the wheel roller. For example, the user may roll the wheel roller in a first direction to move the damping medium closer to the magnet and in a second direction, opposite the first direction, to move the damping medium further from the magnet. In some embodiments, a magnetic sensor may be coupled to the damping medium, such as coupled to the wheel roller, which is coupled to the damping medium, to measure a distance between the damping medium and the magnet. In some embodiments, the input device may be a handheld controller, and the linear magnetic ram may be positioned within a right grip of the handheld controller or a left grip of the handheld controller.

In some embodiments, an information handling system, or an input device, may include a memory and a processor for performing the methods described herein. A computer program product may include a non-transitory computer-readable medium including instructions for causing an information handling system, or an input device, to perform the methods described herein.

For example, the methods described herein may be embedded in a computer-readable medium as computer program code comprising instructions that cause a processor to perform operations corresponding to the steps of the method. In some embodiments, the processor may be part of an information handling system, or an input device, including a first network adaptor configured to transmit data over a first network connection; and a processor coupled to the first network adaptor, and the memory.

In some embodiments, the aspects described herein may be used to support the execution of gaming applications in different environments. Gaming sessions may execute on a service, either locally on a device, on another system on the network, or in the cloud. A device may access the gaming session by executing an application that communicates with the service to receive and transmit user input to the service and provide feedback to the user from the service. The device may include its own audio/visual (AV) output for displaying a graphical user interface and/or a rendered display from the gaming session. Different environments at a location may include different AV systems, and the device may be automatically paired with an AV system and may be reconfigured to support interaction with an application session using the paired AV system.

A user's home is one example location that may have multiple environments, such as a living room, a dining room, a study, and/or a bedroom, each with different screen configurations, speaker configurations, and/or network availability. Aspects of embodiments disclosed herein may provide a system that enables game play from a set of candidate game hosts and environments to consumption devices of a user's choice while the user moves about their home between the different environments. The system may employ methods to determine where a user is located within the home, availability and selection of candidate game hosting and target environments, homing and direction of related I/O, and/or AV for consumption. The system then migrates the user and their information to the determined environment by coordinating gameplay by the user. The solution accommodates multiple users simultaneously within the home, whether in single player, multiplayer using the same screen, or multiplayer using separate screen games. The solution may configure AV and input/output (110) such that multiple users can consume one or multiple games in the home simultaneously, whether in separate locations or when seated together in front of the same consumption device, e.g., a large television, where multiple games might be hosted simultaneously.

The mobility of a user between services and applications for executing an application session may be supported by an information handling system that uses available telemetry from multiple sources to build a confidence-based knowledge graph of the user's gaming environments and determine a position of the user within that graph. A system with knowledge of devices in a user's gaming environment may build a knowledge graph by aggregating and comparing telemetry. For example, network telemetry may reveal that devices are positioned relatively near each other, a mobile device may reveal an absolute location based on GPS data, and/or an infrared presence sensor may reveal that the user is sitting in front a device. An intelligent system may assemble these individual pieces of telemetry into a broader knowledge graph based on the absolute and/or relative locations of the user's devices, the location of the user in relation, and or characteristics of the devices. This knowledge graph may be updated in real time and/or based on changes in device telemetry.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art. As used herein, "pressing" may refer to touching of a surface or applying pressure to a surface of a device, such as a touchpad.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
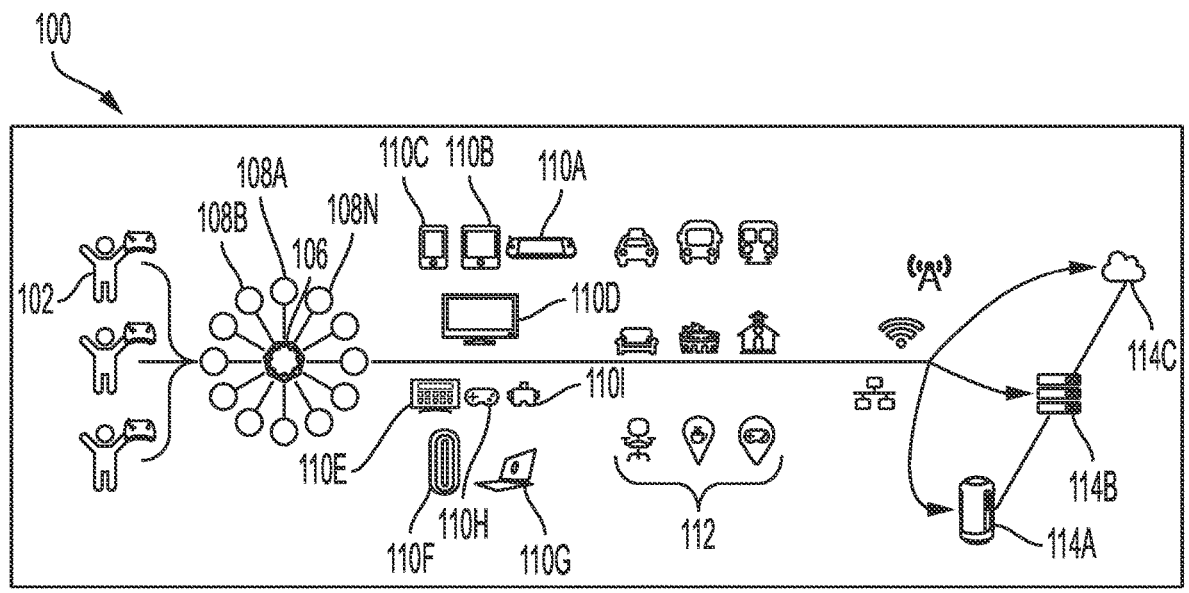
FIG. 1 is a block diagram illustrating aspects of a configurable system for providing services to users according to some embodiments of the disclosure.

These example embodiments describe and illustrate various aspects of a configurable and dynamic gaming environment that can be supported through the use of a hub device, which may be an information handling system. A hub device may be located in a user's home and used to arrange game play sessions (or more generically application sessions) between host devices and services. The host devices may execute an application for receiving an AV stream for displaying rendered content from a game play session (or other application session), and in some configurations also receive user input for interacting with the session from a peripheral device, such as a gaming controller. The AV stream presented by the host device may be generated by a service. The service may execute on the hub device or another information handling system, such as a cloud computing resource. A home may include one or several host devices (e.g., televisions, mobile computers, tablet computers, and personal computers) and may include one or several information handling systems executing the service (e.g., a hub devices and personal computers).

The user's home may be divided into different environments defined by a space around a host device. For example, a living room with a television may be one environment and a bedroom with a personal computer may be another environment. A user may use a peripheral device in one of the environments and the hub device may configure a host device, a service, and the peripheral device for operation in the environment by determining the corresponding environment using a knowledge graph. The knowledge graph provides a database of historical information about the environments from which the hub device may use current characteristics of the peripheral device to deduce the location, and thus current environment, of the peripheral device. For example, the knowledge graph may include information about location of rooms (e.g., environments) in the house based on wireless signatures of devices within the different rooms. This difference in signatures reflects that a device on a one side of the house may receive beacon signals from different neighboring access points than a device on an opposite side of the house. When a user carries the peripheral device around the house, the hub device may determine a location of the peripheral device based on visible access points to the peripheral device. Other example characteristics beyond wireless signature for determining location are described in further detail below, and the knowledge graph may be used to combine different characteristics to identify the location, and thus environment, of the peripheral device.

Based on the location of the peripheral device determined from the knowledge graph, the hub device may initialize an application session for the peripheral device by determining an appropriate host device and service for the application session. For example, if the peripheral device is in the living room and is requesting a game that is within the capabilities of the service on the hub device to execute, the hub device may initialize an application session for the peripheral device between the television as a consumption device and the hub device as a service. The service on the hub device executes the game and streams rendered content to an application executing on the television consumption device.

The hub device may be used to migrate the peripheral device to a different environment and/or migrate the application session between host devices and/or services. For example, initially the application session may use a communication link between the peripheral device and the television host device for receiving user input, in which the application executing on the television host device relays user input to the service through a backhaul communication link from the television host device to the hub device. During the application session, the hub device may monitor characteristics of the peripheral device, including signal strength of connection to other components, and determine that the communication link from the peripheral device to the hub device is stronger than the peripheral device to the television host device. The hub device may migrate the peripheral device to a communications link with the hub device such that the service executing on the hub device directly receives the user input but the streaming session continues from the service to the application executing on the television host device. Such a change is illustrated in the change in configuration from FIG. 3A to the configuration of FIG. 3B described in further detail below.

Other aspects of the application session may also be migrated. For example, if the peripheral device is determined to move to a different environment, then the hub device may migrate the application session to an application executing on a host device within the new environment. As another example, if a connection between the television host device and the service becomes unstable, the hub device may recommend and/or initiate a migration of the application session to a different host device. One scenario for such a migration may be where the television host device is connected through a wireless link to the service in which the wireless link quality is reducing quality of the streaming and a second host device with a wired connection is available in a nearby environment. Each of these example migrations may be determined based on information in the knowledge graph regarding locations of environments and capabilities within those environments. As yet another example, a user may request execution of an application, such as a particular game, during the application session for which a better configuration exists than the current host device and/or current service. The request for a different application, such as a game requiring a certain GPU capability, may cause the hub device to determine that a second device executing a second service is better for hosting the application and migrate the peripheral device to the second service by, for example, reconfiguring network connections.

The hub device may support connecting to multiple peripheral devices. In one example, the hub device may support two peripheral devices using a shared session on one host device to play the same or different games on the host device. In another example, the hub device may support two peripheral devices in different environments using different sessions with different host devices. The hub device may determine the environment of each of the peripheral devices based on characteristics of the device and the knowledge graph and configure application session for each of the peripheral devices accordingly. Different arrangements of peripherals and players may be supported. For example, one hub device executing a service and one host device executing an application can support a configuration with Game A and one player (P1) with peripheral (C1) and Game B and one player (P2) with peripheral (C2); or can support a configuration with Game A and one player (P1) with peripheral (C1) and Game A and one player (P2) with peripheral (C2); or can support a configuration with Game A and two players (P1, P2) with peripherals (C1, C2).

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1 is a block diagram illustrating aspects of a configurable system for providing services to users according some embodiments of the disclosure. A system 100 includes users 102 who may have access to a shared library of applications 106 including applications 108A-108N. The users 102 may have separate libraries, with some overlapping applications between the libraries. The users 102 may access the library 106 through devices 110A-I, such as mobile gaming device 110A, tablet computing device 110B, phone computing device 110C, television 110D, personal computing device 110E, desktop computing device 110F, laptop computing device 110G, game controller 110H, VR headset 110I. The devices 110 may access services at any of locations 112, including cars, busses, homes, hotels, offices, parks, etc. One or more of the devices 110 may communicate with an application session executing on a computing device 114, such as a home application hub 114A, a server 114B, or a cloud execution environment 114C. In some embodiments, environments may only exist for fixed devices, e.g., desktop computers, televisions, etc.

Figure 2:
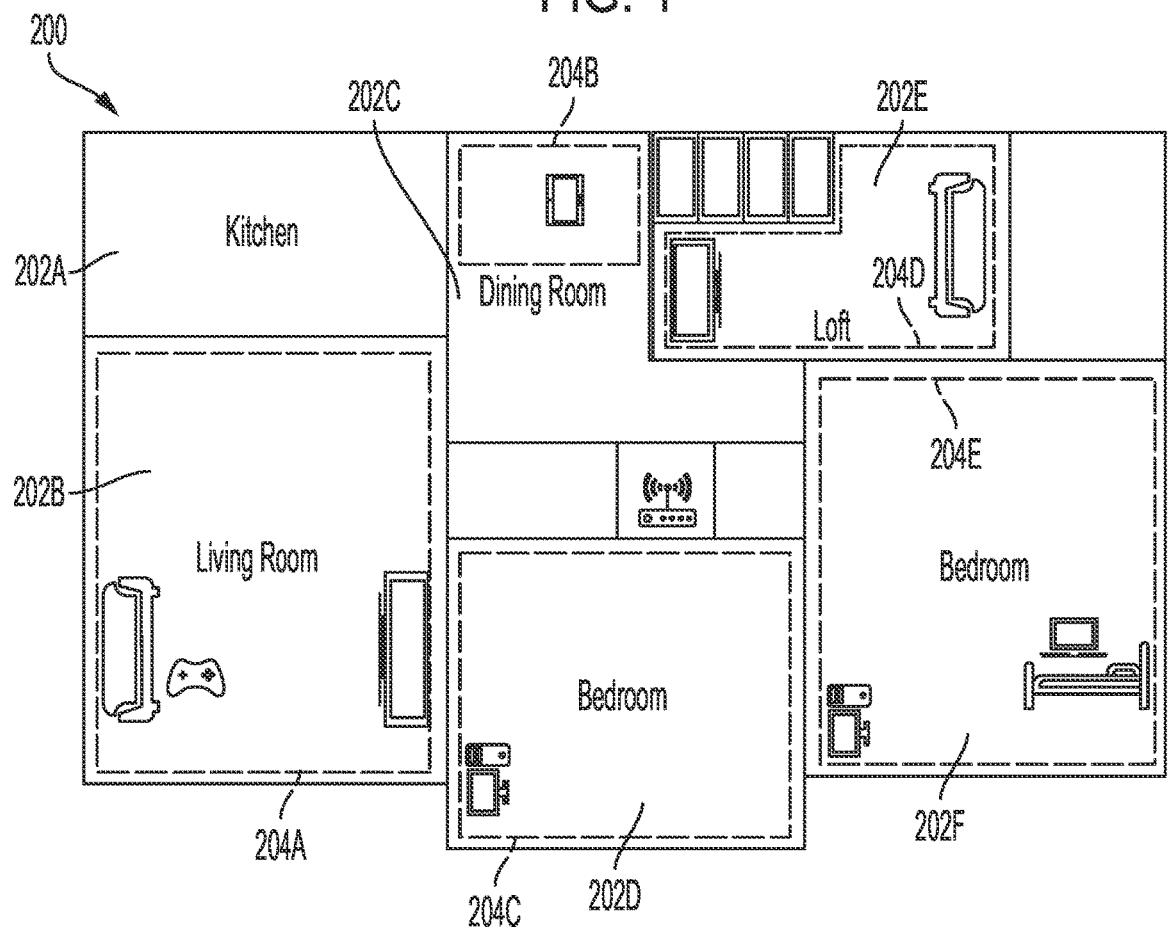
FIG. 2 is a block diagram illustrating possible game environments according to some embodiments of the disclosure.

FIG. 2 is a block diagram illustrating possible game environments according to some embodiments of the disclosure. A user's home 200 may include rooms 202A-F, and each of the rooms may have different information handling systems present, different AV equipment present, and/or different characteristics. For example, a living room 202B may include a large-size television, a bedroom 202D may include a personal computer, and a dining room 202C may include a table computing device. Gaming environments 204A-E in the home 200 may be defined based on spaces where a user is likely to execute an application session. Each gaming environment 204A-E may include numerous devices and gaming environments, devices that may or may not be capable of hosting games, and/or devices that may or may not be capable of receiving game output. A system 100 may allow multiple users in the home 200 to simultaneously execute an application session. In some embodiments, multiple games may be hosted on a single device. In some embodiments, multiple games may target a single output device. In some embodiments, solution manages where games should be hosted, where game output should go, and how to best route peripheral I/O for users.

A user may move between gaming environments 204A-E within the home 200 and continue an application session. For example, a user may take a device, such as a gaming controller, from environment 204A to environment 204C. The gaming controller may migrate and reconfigure for operation in environment 204C from a configuration for environment 204A. For example, the controller may transition from an application hosted on a TV in living room 202B to an application hosted on TV in dining room 202C while remaining connected to a host service executing on a PC in bedroom 202D.

Figure 3A:
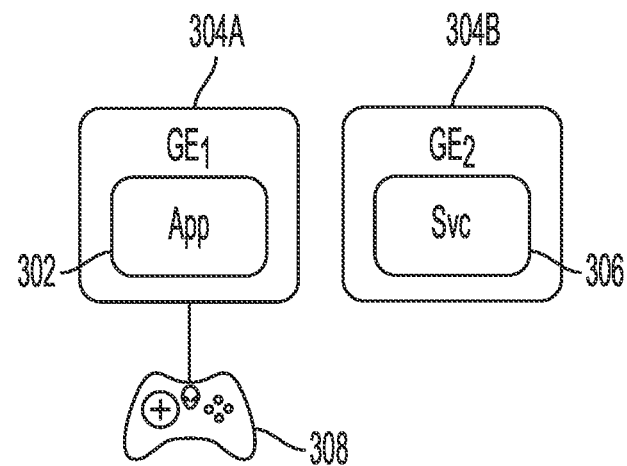
FIG. 3A is a block diagram illustrating application and services hosted in different gaming environments according to some embodiments of the disclosure.

Example configurations for applications and services in gaming environments are shown in FIGS. 3A-3D. FIG. 3A is a block diagram illustrating application and services hosted in different gaming environments according to some embodiments of the disclosure. In FIG. 3A, a first gaming environment 304A may include a device, such as a TV or PC, hosting an application 302, which is an endpoint for an application session such as a gaming session. The application 302 communicates with a service 306, which may be hosted on a device in a different gaming environment 304B. A controller 308 may communicate with the application 302 to receive user input for the application session to control, for example, a character in a game. In some embodiments, the controller 308 is connected to the environment 304A hosting the application and the I/O is configured to be relayed to the environment 304B hosting the actual game.

Figure 3B:
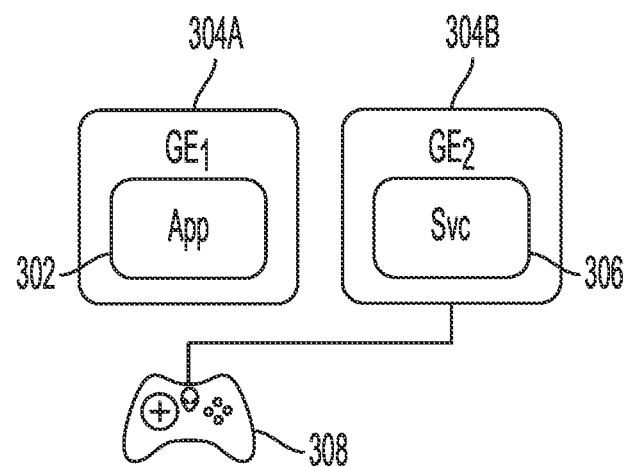
FIG. 3B is a block diagram illustrating application and services hosted in different gaming environments according to some embodiments of the disclosure.

Another arrangement for the application and service is shown in FIG. 3B. FIG. 3B is a block diagram illustrating application and services hosted in different gaming environments according to some embodiments of the disclosure. In FIG. 3B, the controller 308 communicates with the service 306 for providing user input to an application session, with the AV rendering target of the application session being application 302 in a different gaming environment.

Figure 3C:
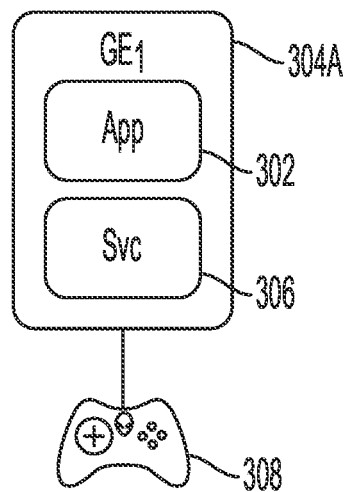
FIG. 3C is a block diagram illustrating application and service hosted in a common gaming environment according to some embodiments of the disclosure.

Another arrangement for the application and service is shown in FIG. 3C. FIG. 3C is a block diagram illustrating application and service hosted in a common gaming environment according to some embodiments of the disclosure. In FIG. 3C, the application 302 and the service 306 are executed in the same gaming environment 304A, which may be a single device, two devices, or a combination of devices in the gaming environment 304A. The controller 308 may communicate with either the service 306 and/or the application 302.

Figure 3D:
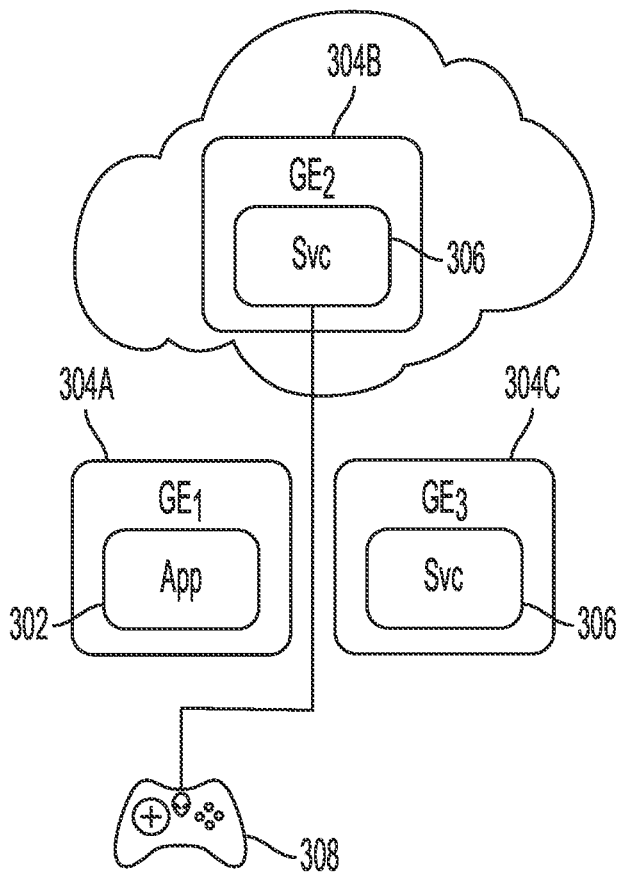
FIG. 3D is a block diagram illustrating a cloud-based service arrangement for a gaming environment according to some embodiments of the disclosure.

A further arrangement for the application and service is shown in FIG. 3D. FIG. 3D is a block diagram illustrating a cloud-based service arrangement for a gaming environment according to some embodiments of the disclosure. In FIG. 3D, the controller 308 may communicate with a service 306 hosted in a gaming environment 304B that is remote from the gaming environment 304A in which the application 302 is executing. The service 306 may be executing, for example, on a remote device, such as when the user's home includes the gaming environment 304B but the user is engaging with application 302 at a location on a different network from their home (e.g., at a friend's house). The service 306 may also or alternatively be executed, for example, on a cloud computing device available as a subscription service to the user.

An information handling system may be connected to an input device, such as a handheld controller, mouse, or other input device, including one or more linear magnetic rams. Linear magnetic rams may generate wide-band haptic feedback by causing a hammer of the ram to impact a damping medium. For example, linear magnetic rams may generate a magnetic field to move a hammer through an inner cavity of a body of the linear magnetic ram, causing the hammer to impact the damping medium. Such operation may provide a wider range of haptic feedback than is able to be produced by other haptic feedback devices, such as eccentric rotating mass (ERM) rumble modules. Furthermore, linear magnetic rams may be capable of producing haptic feedback effects that are unable to be produced by other haptic feedback devices, such as tachammer mode chassis impacts, where a hammer or magnet of a linear magnetic ram impacts a damping medium at a high velocity to provide an intense haptic feedback event or jolt. A position of a damping medium of a linear magnetic ram may be adjustable to provide an even wider range of haptic feedback effects. For example, a distance between a damping medium and one or more components of a linear magnetic ram, such as a magnet of the linear magnetic ram may be increased or decreased to adjust haptic feedback provided by the linear magnetic ram.

Figure 4:
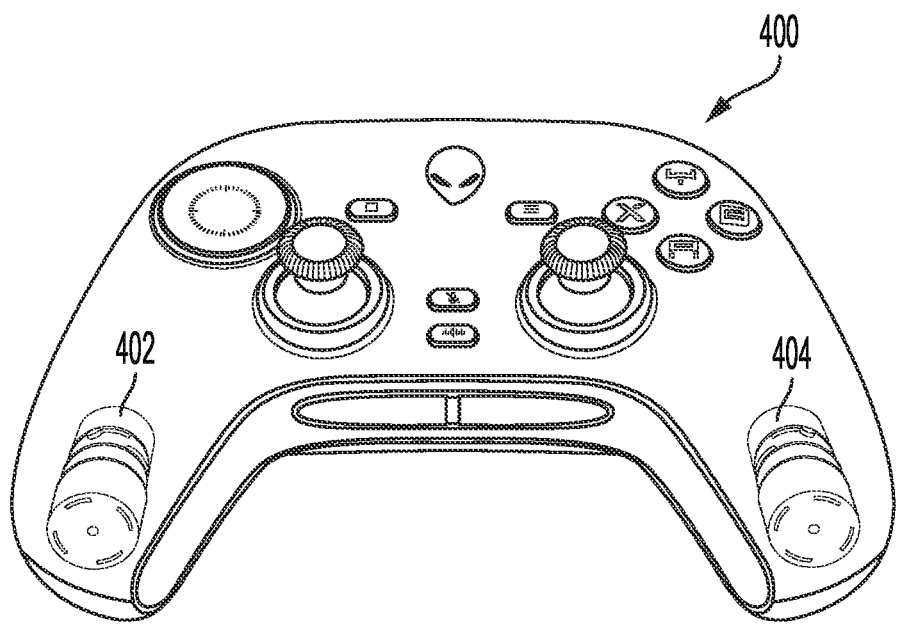
FIG. 4 is a perspective view of an example handheld controller according to some embodiments of the disclosure.

A handheld controller 400, shown in FIG. 4, is one example of an input device that may include a linear magnetic ram module. The handheld controller 400 may include a first linear magnetic ram 402 and a second linear magnetic ram 404 for generating haptic feedback, and the first linear magnetic ram 402 and the second linear magnetic ram 404 may be included in a linear magnetic ram module. In some embodiments, the linear magnetic rams 402, 404 may be included in respective left and right hand grips of a handheld controller 400. In some embodiments, a handheld controller 400 may include fewer or greater than two linear magnetic rams. In some embodiments, linear magnetic rams may be included in other input devices for generation of haptic feedback, such as computer mice, wearable devices, or other input devices.

Figure 5:
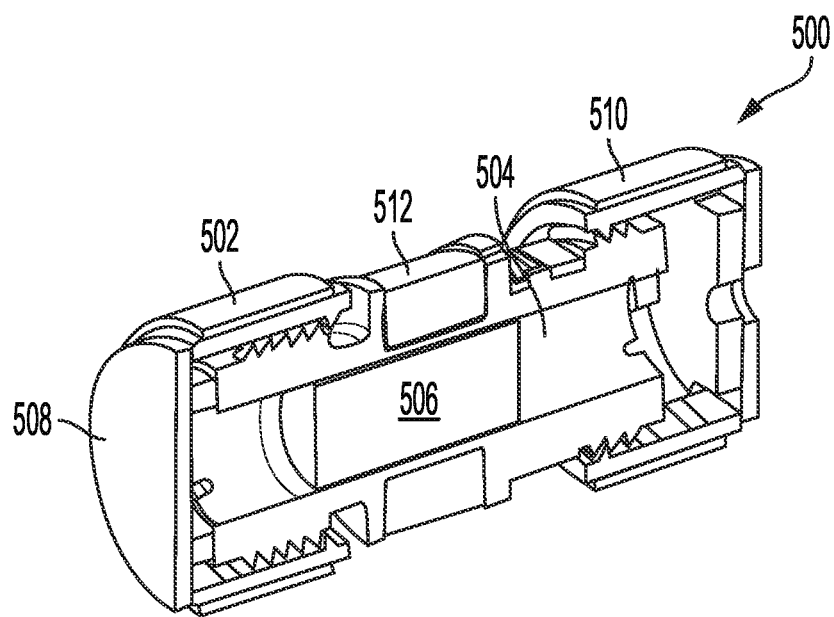
FIG. 5 is a perspective view of a linear magnetic ram according to some embodiments of the disclosure.

A perspective view of an example linear magnetic ram 500 for generating haptic feedback is shown in FIG. 5. The linear magnetic ram 500 may include a housing 502 having a channel 504 for linear movement of a hammer 506 to impact a damping medium 508. A motor module 510 may generate a magnetic field to move the hammer 506 within the channel 504 to impact the damping medium 508. For example, the motor 510 may cause magnet 512 to generate a magnetic field to move the hammer 506 to impact the damping medium 508. The hammer 506 may, for example, be made of a magnetic or metallic substance responsive to a magnetic field generated by magnet 512. A tension on the damping medium 508 may be adjustable to produce different haptic effects when the hammer 506 impacts the damping medium 508. In some embodiments, the linear magnetic ram 500 may be controlled to cause the hammer 506 to impact the damping medium 508 and/or to adjust the distance between the damping medium 508 and one or more components of the linear magnetic ram 500.

Figure 6:
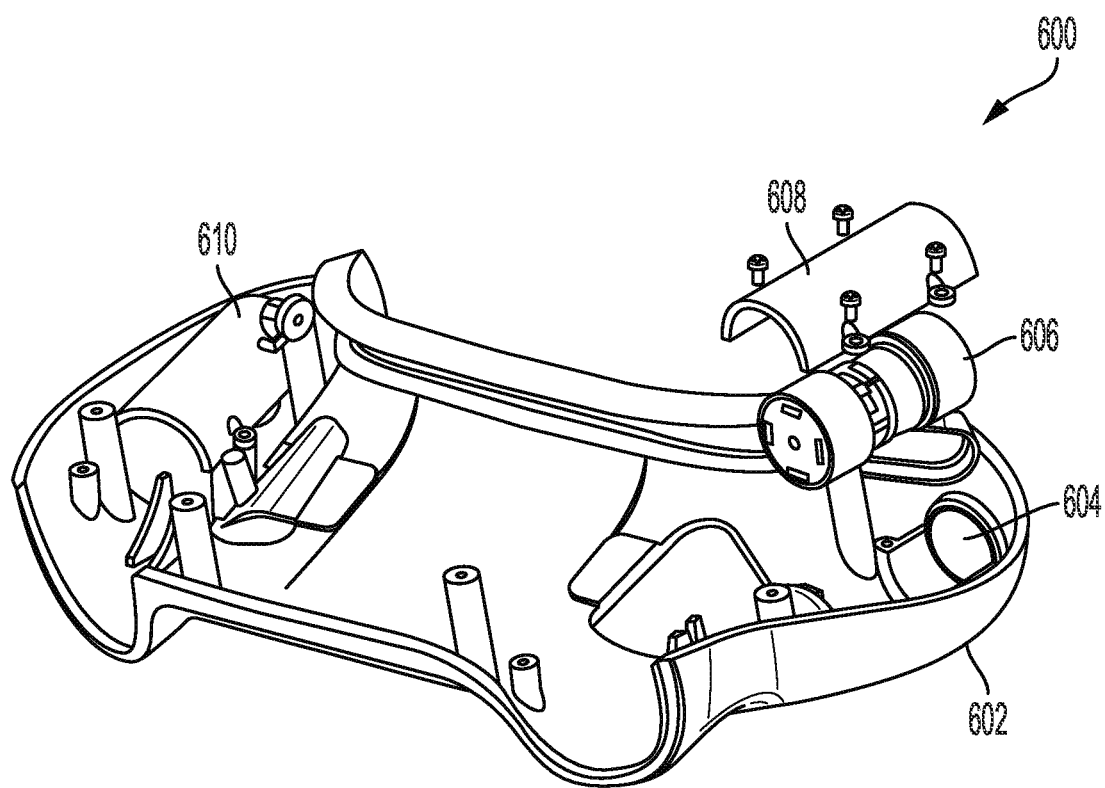
FIG. 6 is a perspective view of an example interior of a handheld controller including to linear magnetic rams according to some embodiments of the disclosure.

An example perspective view of an interior of a handheld controller 600 is shown in FIG. 6. A body 602 of the handheld controller may include a first linear magnetic ram 606, which may be held in place by a first securing mechanism 608. A damping medium 604 may be positioned for impact of a linear magnetic ram. In some embodiments, the damping medium 604 may be formed from a polymer. In some embodiments, the damping medium 604 may be formed from silicone, poron, or another material. The handheld controller 600 may include a second linear magnetic ram 610. In some embodiments, the first linear magnetic ram 606 may be positioned in a left hand grip of the handheld controller 600 and the second linear magnetic ram 610 may be positioned in a right hand grip of the handheld controller 600.

Figure 7:
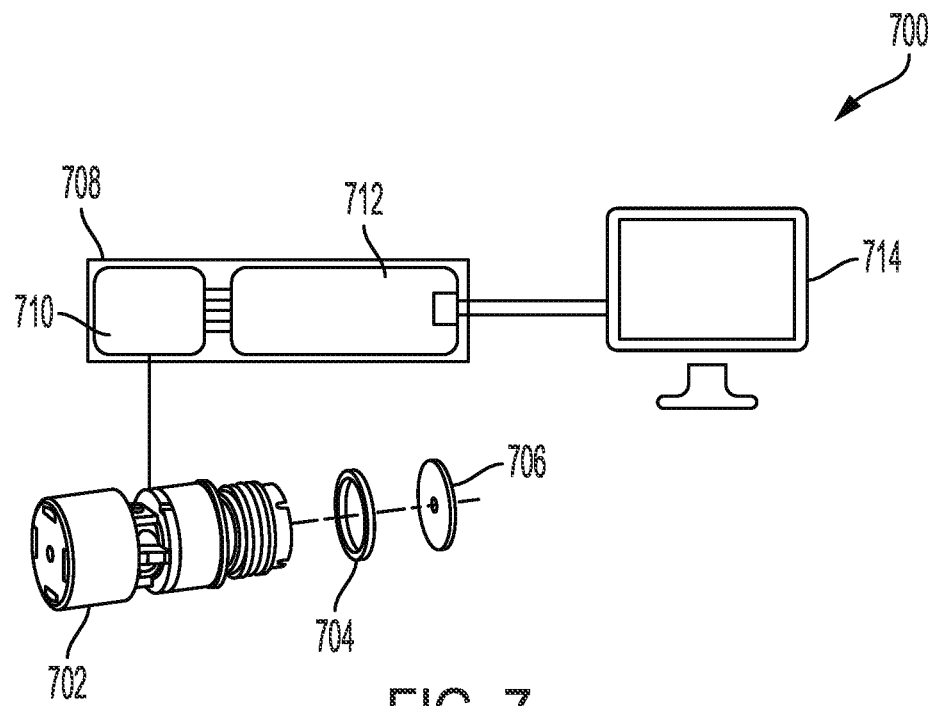
FIG. 7 is a block diagram of a control system for a linear magnetic ram of an input device according to some embodiments of the disclosure.

An example system 700 for controlling a linear magnetic ram 702 is shown in FIG. 7. The linear magnetic ram 702 may include a spacer 704 separating a body of the linear magnetic ram 702 from a damping medium 706. The linear magnetic ram 702 may be controlled by a controller 708 of an input device, which may include a driver module 708 and one or more processing modules 712. The controller 708 may communicate with one or more applications executed by a connected information handling system via an application programming interface (API) 714 to generate haptic feedback by the linear magnetic ram 702. For example, an information handling system may send instructions to the controller 708 through the API 714 to generate one or more haptic feedback effects using the linear magnetic ram 702.

Figure 8:
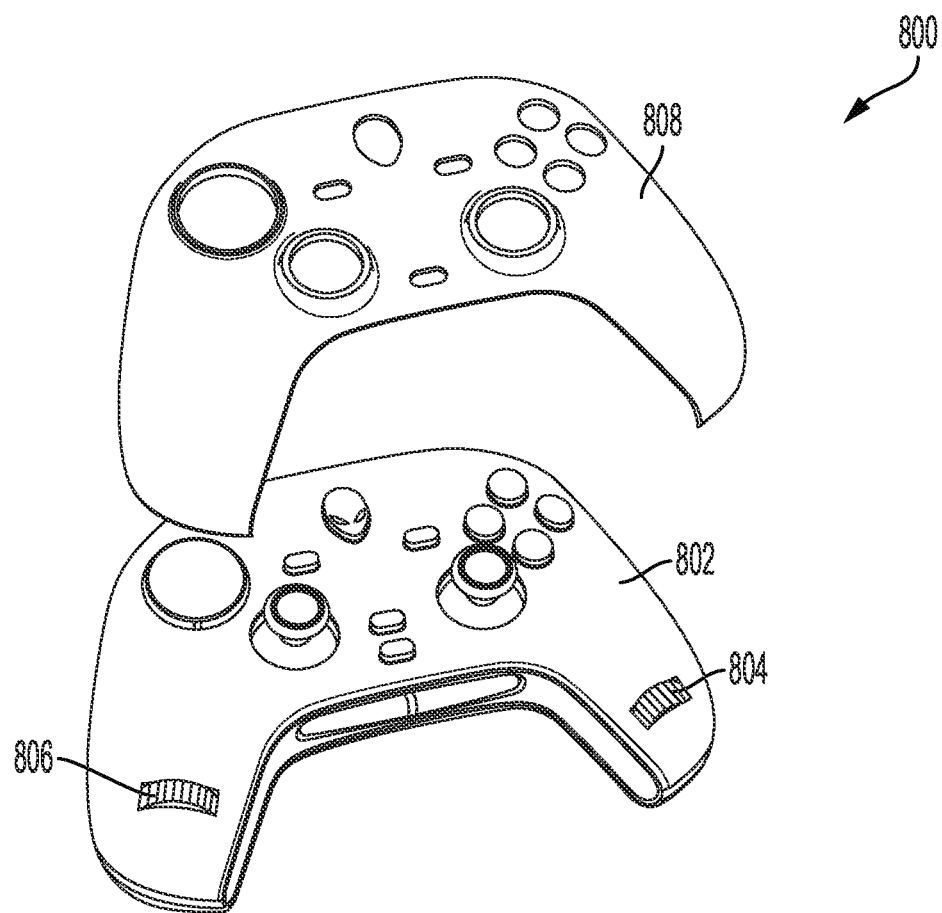
FIG. 8 is a perspective view of an example handheld controller according to some embodiments of the disclosure.

A position of a damping medium of a linear magnetic ram of a handheld controller may be adjusted by a user to customize a haptic feedback profile of a linear magnetic ram. An example handheld controller 800 is shown in FIG. 8. The handheld controller may include a first wheel roller 804 to adjust a position of a first damping medium of a first linear magnetic ram, such as to adjust a position of the first damping medium relative to one or more other components of the linear magnetic ram. For example, rolling the first wheel roller 804 in a first direction may move the damping medium closer to a magnet of the linear magnetic ram, while rolling the first wheel roller 804 in a second direction, opposite the first direction, may move the damping medium further from the magnet of the linear magnetic ram. A second wheel roller 806 may similarly control a position of a second damping medium of a second linear magnetic ram of the handheld controller 800. The first and second wheel rollers 804, 806 may extend beyond a surface of the handheld controller 800 to allow a user to easily adjust the wheel rollers 804, 806. In some embodiments, the first wheel roller 804 may extend beyond a surface of a right hand grip of the handheld controller 800, while a second wheel roller 806 may extend beyond a surface of a left hand grip of the handheld controller 800. A faceplate 808 may be attached to a surface of a body 802 of the handheld controller, allowing a user access to one or more buttons and/or other inputs of the handheld controller 800 while covering the first wheel roller 804 and the second wheel roller 806. Such positioning of a faceplate 808 may enhance user comfort, by allowing the user to grip a smooth surface of the controller 800 on the right hand grip and the left hand grip without coming into contact with the first and second wheel rollers 804, 806.

Figure 9A:
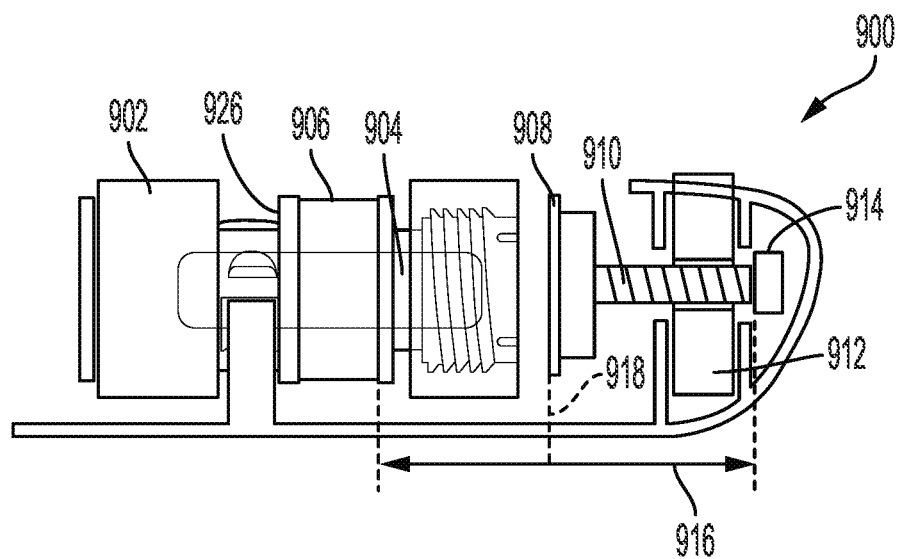
FIG. 9A is a cross-section of an example linear magnetic ram according to some embodiments of the disclosure.
Figure 9B:
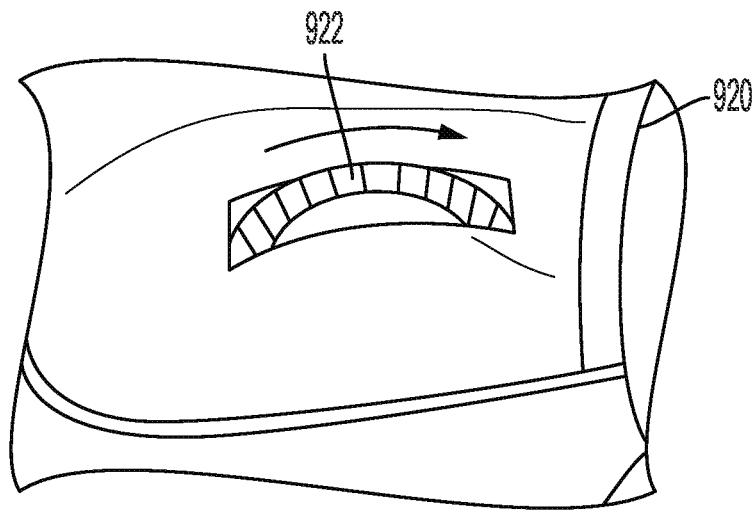
FIG. 9B is a perspective view of an example wheel roller for adjusting a position of a damping medium of a linear magnetic ram according to some embodiments of the disclosure.

An example linear magnetic ram 900 with a damping medium 908 having an adjustable position is shown in FIG. 9. The linear magnetic ram may include a first motor 902. Components of the linear magnetic ram 900 may be housed within a housing 926 providing structure to, stabilizing, and connecting the components of the linear magnetic ram 900. The motor 902 may cause a hammer 904 of the linear magnetic ram to impact the damping medium 908 to generate haptic feedback. For example, the motor 902 may cause a magnet 906 to generate a magnetic field to drive the hammer 904 into the damping medium 908. The damping medium 908 may be attached to a first thread roller 910 to adjust a position of the damping medium. The thread roller 910 may rest within a wheel roller 912, such as within a thread hole of the wheel roller 912 such that, when the wheel roller 912 is turned, the thread roller 910 will also be turned and moved towards or away from the magnet 906. When the wheel roller 912 is turned and, by extension, turns the thread roller 910, the thread roller and attached damping medium 908 may move towards or away from one or more components of the linear magnetic ram 900, such as towards or away from magnet 906. Thus, a position of the damping medium 908 may be adjusted relative to one or more stationary components of the linear magnetic ram 900, such as the magnet 906. Rolling the wheel roller 912 in a first direction, such as from right to left, may move the damping medium 908 towards the magnet 906, while rolling the wheel roller 912 in a second direction, such as from left to right, may move the damping medium 908 away from the magnet 906. Thus, a distance between the damping medium 908 and the magnet 906 may be increased or reduced by rolling the wheel roller 912.

In some embodiments, a magnetic sensor 914 may be attached to the thread roller 910, such as to a first end of the thread roller 910 and may move when the damping medium 908 is moved by the wheel roller 912. Thus, when the damping medium 908 is moved away from the magnet 906, the magnetic sensor 914 may move a same distance from the magnet 906, and when the damping medium 908 is moved closer to the magnet 906, the magnetic sensor may move a same distance towards the magnet 906. The magnetic sensor 914 may sense a change in distance between the damping medium 908 and the magnet 906 by sensing a change in a distance 916 between the magnetic sensor 914 and the magnet 906. For example, the magnetic sensor 914 may sense a magnetic field generated by the magnet 906, and the magnetic sensor 914 or a controller may determine a position of the magnetic sensor 914 relative to the magnet 906 based on a strength of the sensed magnetic field.

Figure 9C:
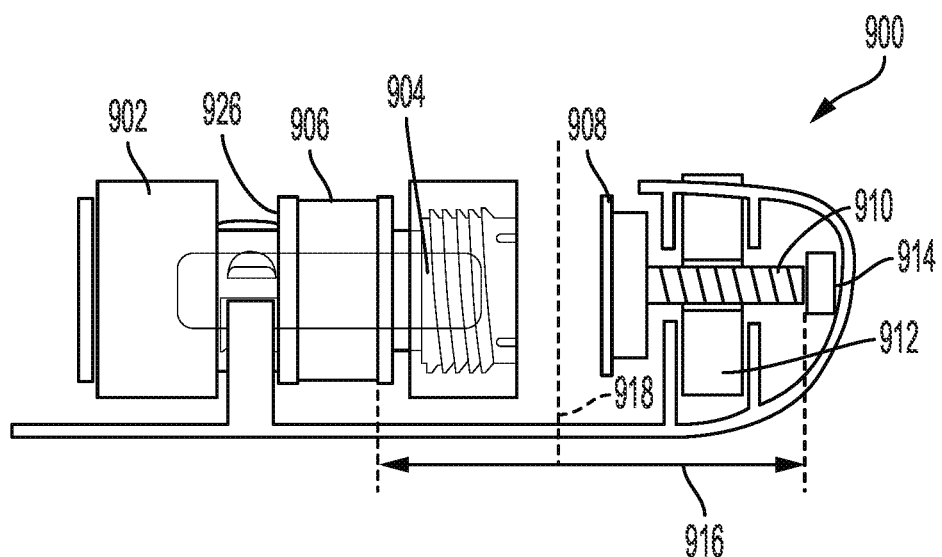
FIG. 9C is a cross-section of an example linear magnetic ram, according to some embodiments of the disclosure.

As one example, a damping medium 908 of a linear magnetic ram 900 may begin at a first position 918. As shown in the perspective view of the handheld controller 920 FIG. 9B, a user may rotate a wheel roller 922, which may correspond to wheel roller 912 of FIG. 9A. Rotating the wheel roller may adjust a position of the damping medium. For example, as shown in FIG. 9C, the position of the damping medium 908 may be adjusted to be further from the magnet 906 than position 918, where the damping medium 908 was positioned before the wheel roller 912 was adjusted. Likewise, the thread roller 910 may also be adjusted in position a corresponding amount, and the magnetic sensor 914 may be adjusted along with the thread roller. Thus, a distance 916 between the magnetic sensor 914 and the magnet 906 may be increased by the same amount as a distance between the damping medium 908 and the magnet 906. A length of a channel in which the hammer 904 may move within the linear magnetic ram 900 may be increased or decreased by adjustment of the position of the damping medium 908 A controller of the input device including the linear magnetic ram 900 may determine that a position of the damping medium 908 has been adjusted based on one or more measurements by the magnetic sensor 914. In some embodiments, a controller of the input device including the linear magnetic ram 900 may cause the hammer 904 to impact the damping medium 908 when the controller determines that a position of the damping medium 908 has been adjusted, to provide a user with real-time feedback on adjustments to the position of the damping medium 908 and to allow the user to determine a preferred feel of haptic feedback corresponding to different damping medium 908 positions.

Figure 10:
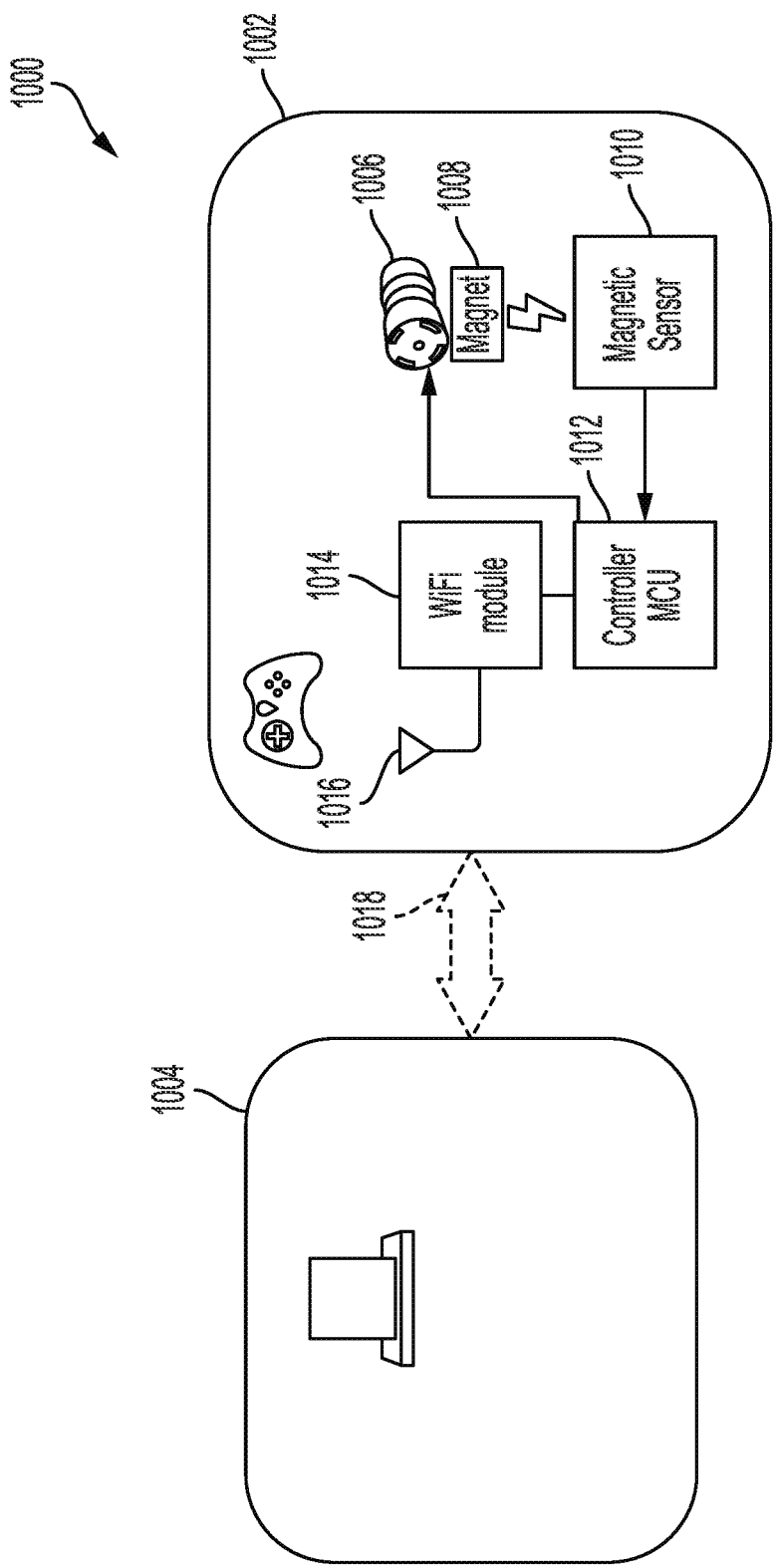
FIG. 10 is a block diagram of an example system for providing user feedback based on adjustments to a position of a damping medium of a linear magnetic ram according to some embodiments of the disclosure

In some embodiments, an input device, such as a handheld controller, may provide a user with real time feedback based on adjustments made to a position of a damping medium. For example, in some embodiments, a handheld controller may transmit information, such as positioning information and/or haptic feedback force information, based on changes in a position of a damping medium to be presented to a user. An example system 1000 for providing feedback related to an adjustable damping medium is shown in FIG. 10. An input device 1002, such as a handheld controller, may communicate with an information handling system 1004, such as a desktop personal computer, a gaming server, or a cloud-based information handling system. In some embodiments, the input device 1002 may communicate with the information handling system 1004 via a wireless connection 1018, such as a Wi-Fi connection. The input device 1002 may include a linear magnetic ram 1006. The linear magnetic ram may include a stationary magnet 1008. A magnetic sensor 1010 may be positioned to move when a damping medium of the linear magnetic ram 1006 is moved, such as to move a same amount and in a same direction as the damping medium. The magnetic sensor 1010 may thus sense when a damping medium is moved and an amount and direction of the movement of the damping medium by measuring a distance between the magnetic sensor 1010 and the magnet 1008 of the linear magnetic ram. Such measurement may, for example, be performed by measuring a strength of a magnetic field of the magnet 1008 The magnetic sensor 1010 may provide measurements to a controller 1012, such as a microcontroller unit or processor, of the input device 1002. In some embodiments, information from the magnetic sensor 1010 may be passed through an analog to digital converter for provision to the controller 1012. The controller 1012 may, based on the measurements received from the magnetic sensor, calculate a distance between the damping medium of the linear magnetic ram 1006 and the magnet 1008. In some embodiments, the magnetic sensor 1010 may periodically measure a distance between the magnetic sensor 1010 and the magnet 1008 and may provide such measurements to the controller 1012, even when a distance between the magnetic sensor 1010 and the magnet has not changed. When the controller detects a change in position of the damping medium based on the measurements received from the magnetic sensor 1010, the controller 1012 may instruct the linear magnetic ram 1006 to generate haptic feedback. For example, the controller may trigger the linear magnetic ram 1006 to cause a hammer of the linear magnetic ram 1006 to impact the damping medium of the linear magnetic ram to provide a user with real time feedback associated with the adjustment of the position of the damping medium. In some embodiments, the controller 1012 may include a first processor and/or a first memory coupled to the first processor.

The controller 1012 may be connected to a Wi-Fi module 1014 to communicate with the information handling system 1004. Communications may, for example, be transmitted using antenna 1016. In some embodiments the controller 1012 may transmit, via the Wi-Fi module 1014, indications of adjustments to a position of the damping medium of the linear magnetic ram 1006, such as an indication of a position of the damping medium, a distance of movement of the damping medium, and/or a direction of movement of the damping medium, or of a distance between the damping medium and the magnet 1008 or between the magnetic sensor 1010 and the magnet 1008. In some embodiments, the controller 1012 may calculate a haptic force of the linear magnetic ram 1006 based on a distance between the magnetic sensor 1010 and the magnet 1008 and may transmit, via Wi-Fi module 1014, an indication of the calculated haptic force to the information handling system 1004. The information handling system 1004 may display received indications for a user, such as in a user profile of a user. Such display may include transmitting information regarding the input device 1002 to another information handling system for display by another information handling system.

Figure 11:
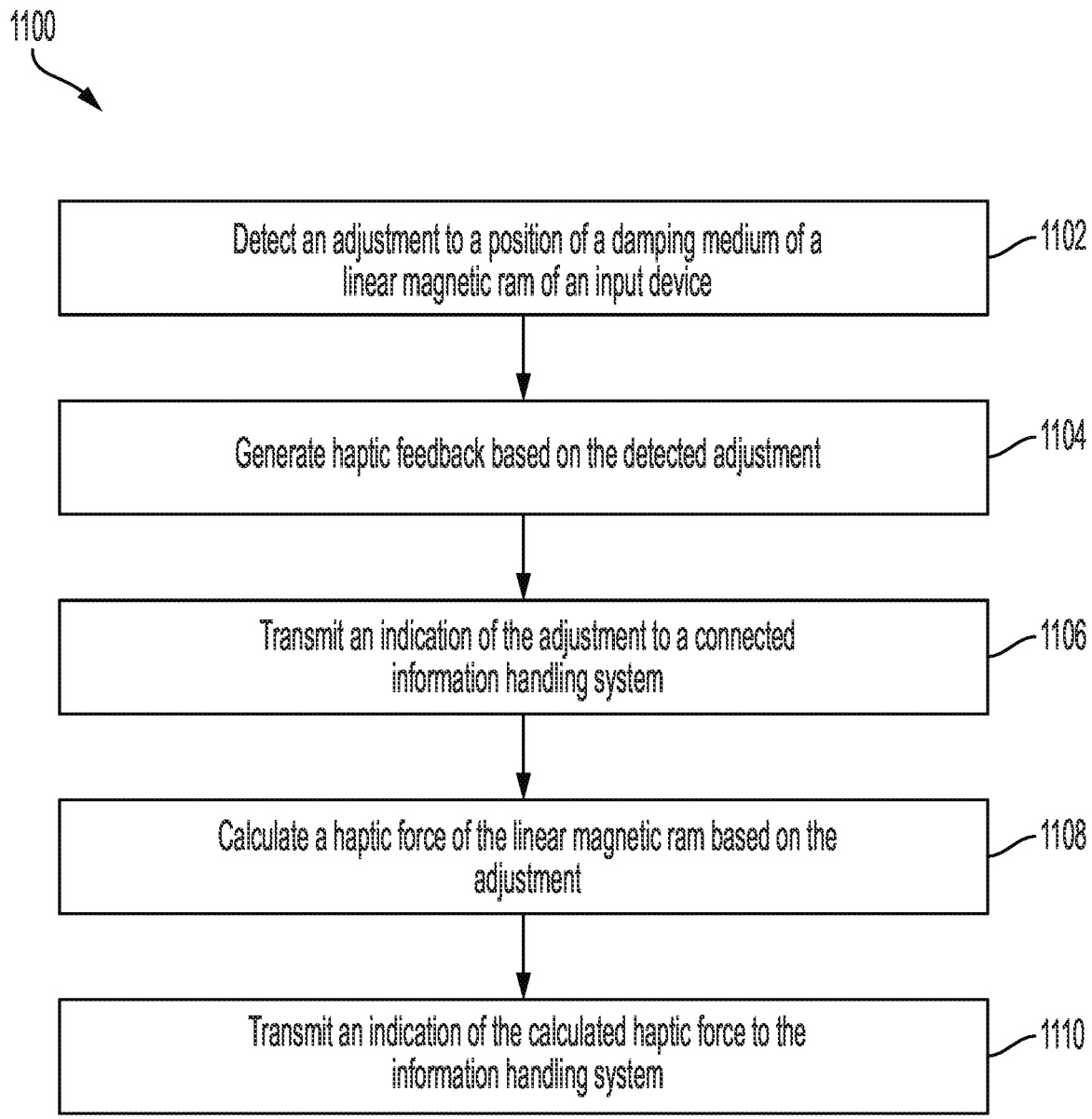
FIG. 11 is a flow chart of an example method for adjusting a position of a damping medium of a linear magnetic ram according to some embodiments of the disclosure.

An example method 1100 for adjusting a position of a damping medium of a linear magnetic ram is shown in FIG. 11. The method 1100 may, for example, be performed by an input device including a linear magnetic ram, such as a handheld controller. The method 1100 may begin at block 1102 with detecting an adjustment to a position of a damping medium of a linear magnetic ram of the input device. For example, the adjustment to the position of the damping medium may be an adjustment to a distance between the damping medium and one or more stationary components of the linear magnetic ram, such as a magnet of the linear magnetic ram. In particular, the detected adjustment may be movement of the damping medium closer to the magnet of the linear magnetic ram, reducing a length of a channel in which a hammer of the linear magnetic ram may move, or movement of the damping medium further from the magnet of the linear magnetic ram, increasing a length of a channel in which a hammer of the linear magnetic ram may move. Detecting the adjustment of the position of the damping medium may, for example, include measuring by a magnetic sensor coupled to the damping medium a distance between the magnetic sensor and the magnet of the linear magnetic ram. Measuring a distance between the magnetic sensor and the magnet may, for example, include sensing a strength of a magnetic field of the magnet by the magnetic sensor. As the magnetic sensor is coupled to the damping medium, a change in a position of the magnetic sensor relative to the magnet corresponds to a change in a position of the damping medium relative to the magnet. In some embodiments, the detected adjustment may be a manual adjustment. For example, a user may manually adjust a wheel roller of the input device, coupled to the damping medium, to adjust the position of the damping medium, and such an adjustment may be detected.

At block 1104, the input device may generate haptic feedback based on the detected adjustment. For example, a controller of the handheld controller may receive measurements from a magnetic sensor coupled to the damping medium indicating movement of the magnetic sensor and may cause the linear magnetic ram to generate haptic feedback in response to the detected movement. Such haptic feedback may include causing a hammer of the linear magnetic ram to impact the damping medium.

At block 1106, the input device may transmit an indication of the adjustment to a connected information handling system. Such an indication may, for example, include an indication of a position of the damping medium, an indication of a distance between the damping medium and one or more components of the linear magnetic ram, such as a magnet of the linear magnetic ram, an indication of a distance that the damping medium was moved, an indication of a direction of movement of the damping medium, and other indications.

At block 1108, the input device may calculate a haptic force of the linear magnetic ram based on the adjustment. For example, a controller of the linear magnetic ram may calculate a haptic force of the linear magnetic ram based on a determined distance between the damping medium and one or more components of the linear magnetic ram, such as a magnet of the linear magnetic ram.

At block 1110, the input device may transmit an indication of the calculated haptic force to the information handling system. In some embodiments, the information handling system may present to a user the indication of the adjustment to the position of the damping medium and/or the indication of the calculated haptic force. Thus, a position of a damping medium of a linear magnetic ram of an input device may be adjusted and a user may be provided with active haptic and/or visual feedback corresponding to the adjustment.

Figure 12:
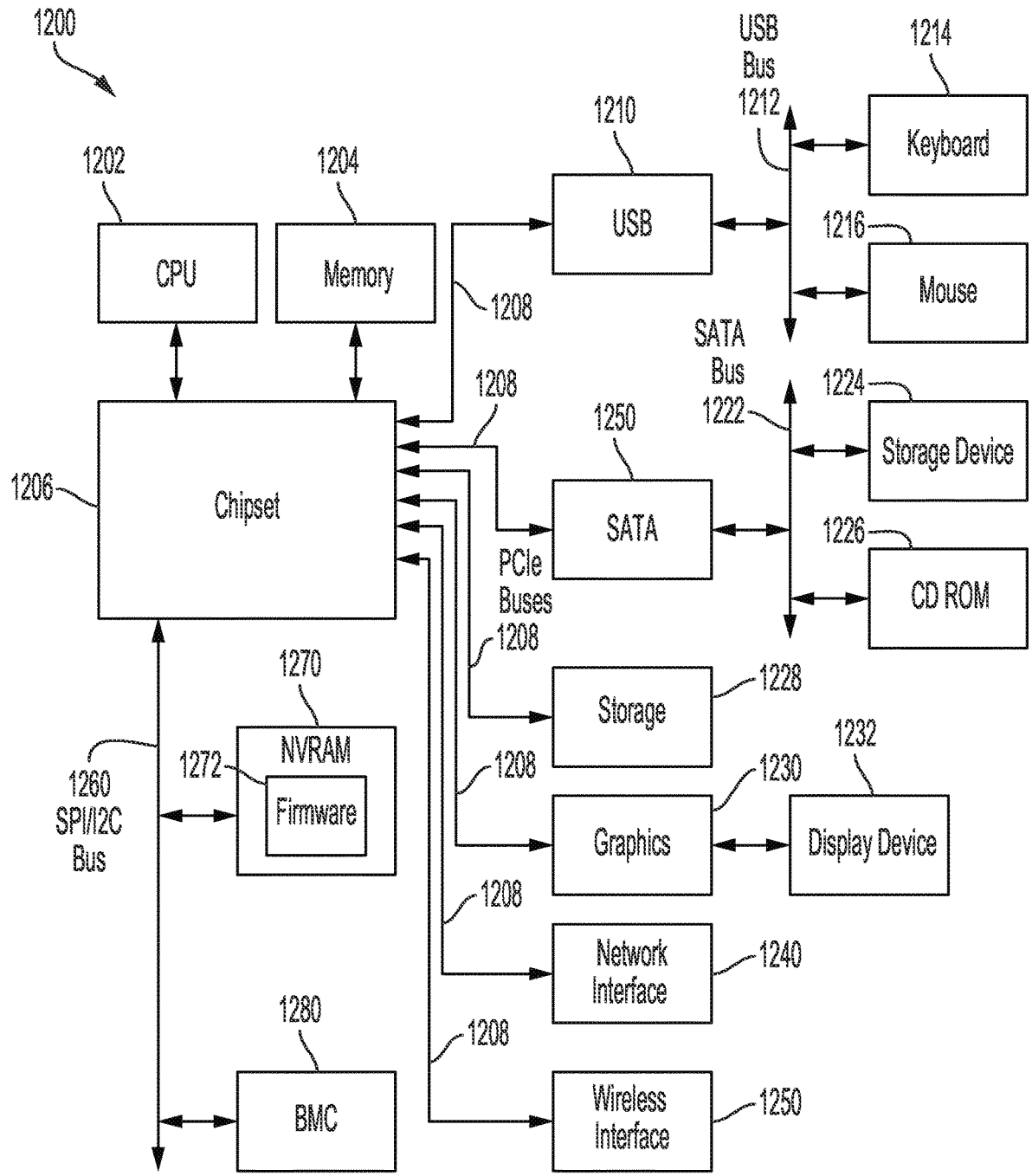
FIG. 12 is a block diagram of an example information handling system according to some embodiments of the disclosure.

FIG. 12 illustrates an example information handling system 1200. Information handling system 1200 may include a processor 1202 (e.g., a central processing unit (CPU)), a memory (e.g., a dynamic random-access memory (DRAM)) 1204, and a chipset 1206. In some embodiments, one or more of the processor 1202, the memory 1204, and the chipset 1206 may be included on a motherboard (also referred to as a mainboard), which is a printed circuit board (PCB) with embedded conductors organized as transmission lines between the processor 1202, the memory 1204, the chipset 1206, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 1202, the memory 1204, the chipset 1206, and/or other components may be organized as a System on Chip (SoC).

The processor 1202 may execute program code by accessing instructions loaded into memory 1204 from a storage device, executing the instructions to operate on data also loaded into memory 1204 from a storage device, and generate output data that is stored back into memory 1204 or sent to another component. The processor 1202 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 1202 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 1206 may facilitate the transfer of data between the processor 1202, the memory 1204, and other components. In some embodiments, chipset 1206 may include two or more integrated circuits (ICs), such as a northbridge controller coupled to the processor 1202, the memory 1204, and a southbridge controller, with the southbridge controller coupled to the other components such as USB 1210, SATA 1220, and PCIe buses 1208. The chipset 1206 may couple to other components through one or more PCIe buses 1208.

Some components may be coupled to one bus line of the PCIe buses 1208, whereas some components may be coupled to more than one bus line of the PCIe buses 1208. One example component is a universal serial bus (USB) controller 1210, which interfaces the chipset 1206 to a USB bus 1212. A USB bus 1212 may couple input/output components such as a keyboard 1214 and a mouse 1216, but also other components such as USB flash drives, or another information handling system. Another example component is a SATA bus controller 1220, which couples the chipset 1206 to a SATA bus 1222. The SATA bus 1222 may facilitate efficient transfer of data between the chipset 1206 and components coupled to the chipset 1206 and a storage device 1224 (e.g., a hard disk drive (HDD) or solid-state disk drive (SDD)) and/or a compact disc read-only memory (CD-ROM) 1226. The PCIe bus 1208 may also couple the chipset 1206 directly to a storage device 1228 (e.g., a solid-state disk drive (SDD)). A further example of an example component is a graphics device 1230 (e.g., a graphics processing unit (GPU)) for generating output to a display device 1232, a network interface controller (NIC) 1240, and/or a wireless interface 1250 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 1206 may also be coupled to a serial peripheral interface (SPI) and/or Inter-Integrated Circuit (I2C) bus 1260, which couples the chipset 1206 to system management components. For example, a non-volatile random-access memory (NVRAM) 1270 for storing firmware 1272 may be coupled to the bus 1260. As another example, a controller, such as a baseboard management controller (BMC) 1280, may be coupled to the chipset 1206 through the bus 1260. BMC 1280 may be referred to as a service processor or embedded controller (EC). Capabilities and functions provided by BMC 1280 may vary considerably based on the type of information handling system. For example, the term baseboard management system may be used to describe an embedded processor included at a server, while an embedded controller may be found in a consumer-level device. As disclosed herein, BMC 1280 represents a processing device different from processor 1202, which provides various management functions for information handling system 1200. For example, an embedded controller may be responsible for power management, cooling management, and the like. An embedded controller included at a data storage system may be referred to as a storage enclosure processor or a chassis processor.

System 1200 may include additional processors that are configured to provide localized or specific control functions, such as a battery management controller. Bus 1260 can include one or more busses, including a Serial Peripheral Interface (SPI) bus, an Inter-Integrated Circuit (I2C) bus, a system management bus (SMBUS), a power management bus (PMBUS), or the like. BMC 1280 may be configured to provide out-of-band access to devices at information handling system 1200. Out-of-band access in the context of the bus 1260 may refer to operations performed prior to execution of firmware 1272 by processor 1202 to initialize operation of system 1200.

Firmware 1272 may include instructions executable by processor 1202 to initialize and test the hardware components of system 1200. For example, the instructions may cause the processor 1202 to execute a power-on self-test (POST). The instructions may further cause the processor 1202 to load a boot loader or an operating system (OS) from a mass storage device. Firmware 1272 additionally may provide an abstraction layer for the hardware, such as a consistent way for application programs and operating systems to interact with the keyboard, display, and other input/output devices. When power is first applied to information handling system 1200, the system may begin a sequence of initialization procedures, such as a boot procedure or a secure boot procedure. During the initialization sequence, also referred to as a boot sequence, components of system 1200 may be configured and enabled for operation and device drivers may be installed. Device drivers may provide an interface through which other components of the system 1200 can communicate with a corresponding device. The firmware 1272 may include a basic input-output system (BIOS) and/or include a unified extensible firmware interface (UEFI). Firmware 1272 may also include one or more firmware modules of the information handling system. Additionally, configuration settings for the firmware 1272 and firmware of the information handling system 1200 may be stored in the NVRAM 1270. NVRAM 1270 may, for example, be a non-volatile firmware memory of the information handling system 1200 and may store a firmware memory map namespace 1200 of the information handling system. NVRAM 1270 may further store one or more container-specific firmware memory map namespaces for one or more containers concurrently executed by the information handling system.

Information handling system 1200 may include additional components and additional busses, not shown for clarity. For example, system 1200 may include multiple processor cores (either within processor 1202 or separately coupled to the chipset 1206 or through the PCIe busses 1208), audio devices (such as may be coupled to the chipset 1206 through one of the PCIe busses 1208), or the like. While a particular arrangement of bus technologies and interconnections is illustrated for the purpose of example, one of skill will appreciate that the techniques disclosed herein are applicable to other system architectures. System 1200 may include multiple processors and/or redundant bus controllers. In some embodiments, one or more components may be integrated together in an integrated circuit (IC), which is circuitry built on a common substrate. For example, portions of chipset 1206 can be integrated within processor 1202. Additional components of information handling system 1200 may include one or more storage devices that may store machine-executable code, one or more communications ports for communicating with external devices, and various input and output (I/O) devices, such as a keyboard, a mouse, and a video display.

In some embodiments, processor 1202 may include multiple processors, such as multiple processing cores for parallel processing by the information handling system 1200. For example, the information handling system 1200 may include a server comprising multiple processors for parallel processing. In some embodiments, the information handling system 1200 may support virtual machine (VM) operation, with multiple virtualized instances of one or more operating systems executed in parallel by the information handling system 1200. For example, resources, such as processors or processing cores of the information handling system may be assigned to multiple containerized instances of one or more operating systems of the information handling system 1200 executed in parallel. A container may, for example, be a virtual machine executed by the information handling system 1200 for execution of an instance of an operating system by the information handling system 1200. Thus, for example, multiple users may remotely connect to the information handling system 1200, such as in a cloud computing configuration, to utilize resources of the information handling system 1200, such as memory, processors, and other hardware, firmware, and software capabilities of the information handling system 1200. Parallel execution of multiple containers by the information handling system 1200 may allow the information handling system 1200 to execute tasks for multiple users in parallel secure virtual environments.

The schematic or flow chart diagram FIG. 11 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Machine learning models, as described herein, may include logistic regression techniques, linear discriminant analysis, linear regression analysis, artificial neural networks, machine learning classifier algorithms, or classification/regression trees in some embodiments. In various other embodiments, machine learning systems may employ Naive Bayes predictive modeling analysis of several varieties, learning vector quantization artificial neural network algorithms, or implementation of boosting algorithms such as Adaboost or stochastic gradient boosting systems for iteratively updating weighting to train a machine learning classifier to determine a relationship between an influencing attribute, such as received device data, and a system, such as an environment or particular user, and/or a degree to which such an influencing attribute affects the outcome of such a system or determination of environment.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
    detecting, by an input device for an information handling system, an adjustment to a position of a damping medium of a linear magnetic ram of the input device; and
    generating, by the input device, haptic feedback based on the detected adjustment,
    wherein detecting the adjustment to the position of the damping medium comprises measuring, by a magnetic sensor coupled to the damping medium, a value corresponding to a distance between the magnetic sensor and a magnet of the linear magnetic ram.

2. The method of claim 1, further comprising:
    transmitting, by the input device to the information handling system, an indication of the adjustment to the position of the damping medium.

3. The method of claim 1, wherein the adjustment to the position of the damping medium comprises a change in a distance between the damping medium and a magnet of the linear magnetic ram.

4. The method of claim 1, further comprising:
    calculating, by the input device, a haptic force of the linear magnetic ram based on the distance between the magnetic sensor and the magnet of the linear magnetic ram; and
    transmitting, by the input device to the information handling system, the calculated haptic force.

5. The method of claim 1, wherein detecting the adjustment to the position of the damping medium comprises:
    detecting a manual adjustment to the position of the damping medium by a wheel roller of the input device.

6. The method of claim 1, wherein the input device is a handheld controller.

7. An input device for an information handling system, comprising:
    a memory; and
    at least one processor coupled to the memory, wherein the at least one processor is configured to:
        detect an adjustment to a position of a damping medium of a linear magnetic ram of the input device; and
        generate haptic feedback based on the detected adjustment,
    wherein to detect the adjustment to the position of the damping medium, the at least one processor is further configured to measure, by a magnetic sensor coupled to the damping medium, a distance between the magnetic sensor and a magnet of the linear magnetic ram.

8. The input device of claim 7, wherein the at least one processor is further configured to:
    transmit, to the information handling system, an indication of the adjustment to the position of the damping medium.

9. The input device of claim 7, wherein the adjustment to the position of the damping medium comprises a change in a distance between the damping medium and a magnet of the linear magnetic ram.

10. The input device of claim 7, wherein the at least one processor is further configured to:
    calculate a haptic force of the linear magnetic ram based on the distance between the magnetic sensor and the magnet of the linear magnetic ram; and
    transmit, to the information handling system, the calculated haptic force.

11. The input device of claim 7, wherein to detect the adjustment to the position of the damping medium, the at least one processor is further configured to:
    detect a manual adjustment to the position of the damping medium by a wheel roller of the input device.

12. The input device of claim 8, wherein the input device is a handheld controller.

13. A hand-held input device for an information handling system comprising:
    a linear magnetic ram, wherein the linear magnetic ram comprises:
        a housing;
        a hammer;
        a magnet;
        a damping medium; and
        a motor for causing the magnet to drive the hammer to impact the damping medium,
        wherein a distance between the damping medium and the magnet is adjustable wherein the damping medium is coupled to a thread roller for adjusting a distance between the damping medium and the magnet.

14. The hand-held input device of claim 13, wherein the thread roller is positioned within a wheel roller of the input device, and wherein the wheel roller is configured to adjust a position of the thread roller.

15. The hand-held input device of claim 14, wherein the wheel roller extends above a surface of the input device to allow a user to adjust the distance between the damping medium and the magnet by adjusting the wheel roller.

16. The hand-held input device of claim 13, further comprising a magnetic sensor coupled to the damping medium to measure a distance between the damping medium and the magnet.

17. The hand-held input device of claim 13, wherein the input device is a handheld controller, and wherein the linear magnetic ram is positioned within a right grip of the hand-held controller or a left grip of the handheld controller.

\* \* \* \* \*